(12) United States Patent
Faulkner

(10) Patent No.: US 6,931,783 B1
(45) Date of Patent: Aug. 23, 2005

(54) FISHING LURE WITH CONCEALED HOOK

(76) Inventor: Sammy Marston Faulkner, 2144 Section Line Rd., Albertville, AL (US) 35950

( * ) Notice: Subject to any disclaimer, the term of this patent is extended or adjusted under 35 U.S.C. 154(b) by 0 days.

(21) Appl. No.: 10/715,399

(22) Filed: Nov. 19, 2003

Related U.S. Application Data

(63) Continuation-in-part of application No. 10/310,788, filed on Dec. 6, 2002, now abandoned.

(51) Int. Cl.[7] ............................................. A01K 83/02
(52) U.S. Cl. ......................................................... 43/35
(58) Field of Search ................................ 43/34, 35, 36, 43/37

(56) References Cited

U.S. PATENT DOCUMENTS

| | | | | |
|---|---|---|---|---|
| 806,898 | A | * | 12/1905 | Kepler ........................... 43/55 |
| 969,014 | A | * | 8/1910 | Walters .......................... 43/55 |
| 1,571,770 | A | * | 2/1926 | Fonner ........................... 43/35 |
| 1,890,266 | A | | 12/1932 | Schadell |
| 2,205,773 | A | * | 6/1940 | Fox ................................. 43/35 |
| 2,277,553 | A | * | 3/1942 | Malmborg ...................... 43/35 |
| 2,517,844 | A | * | 8/1950 | Cooney .......................... 43/35 |
| 2,520,065 | A | * | 8/1950 | Rudy .............................. 43/35 |
| 2,670,558 | A | * | 3/1954 | Prentice ......................... 43/35 |
| 2,700,842 | A | * | 2/1955 | Lehmann ....................... 43/35 |
| 2,729,013 | A | * | 1/1956 | Chandler ....................... 43/35 |
| 2,794,286 | A | * | 6/1957 | Albach .......................... 43/35 |
| 3,018,582 | A | * | 1/1962 | Anderson ...................... 43/35 |
| 3,665,634 | A | * | 5/1972 | Baud ............................. 43/35 |
| 4,020,583 | A | | 5/1977 | Gatlyn |
| 4,176,489 | A | | 12/1979 | Levstaik |
| 4,528,770 | A | * | 7/1985 | McDiarmid ................... 43/35 |
| 4,562,661 | A | | 1/1986 | Messinger |
| 4,782,618 | A | | 11/1988 | Rainey |
| 5,010,679 | A | * | 4/1991 | Tischer ..................... 43/42.04 |
| 5,097,619 | A | | 3/1992 | Bologna |
| 5,611,166 | A | * | 3/1997 | Day .............................. 43/35 |

* cited by examiner

*Primary Examiner*—Kurt Rowan
(74) *Attorney, Agent, or Firm*—Dowell & Dowell, PC

(57) ABSTRACT

A non-fouling fishing lure having a body in or to which at least one hook is pivotally mounted but is normally concealed within or adjacent the body. The shank of the hook is adapted to be connected to a fishing line and the hook is normally engaged by a retaining clip having a portion extending from the body so that when engaged by the mouth of a fish, the clip is shifted from the hook, thereby releasing the hook to pivot outwardly of the body.

20 Claims, 3 Drawing Sheets

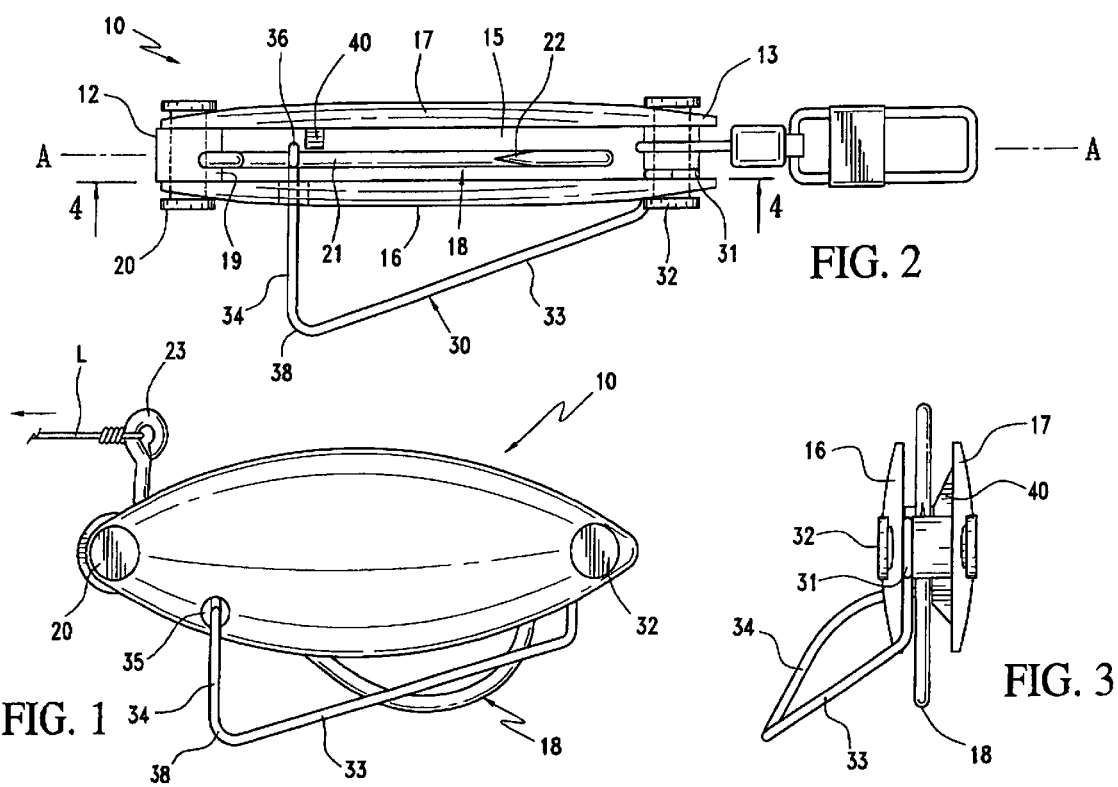

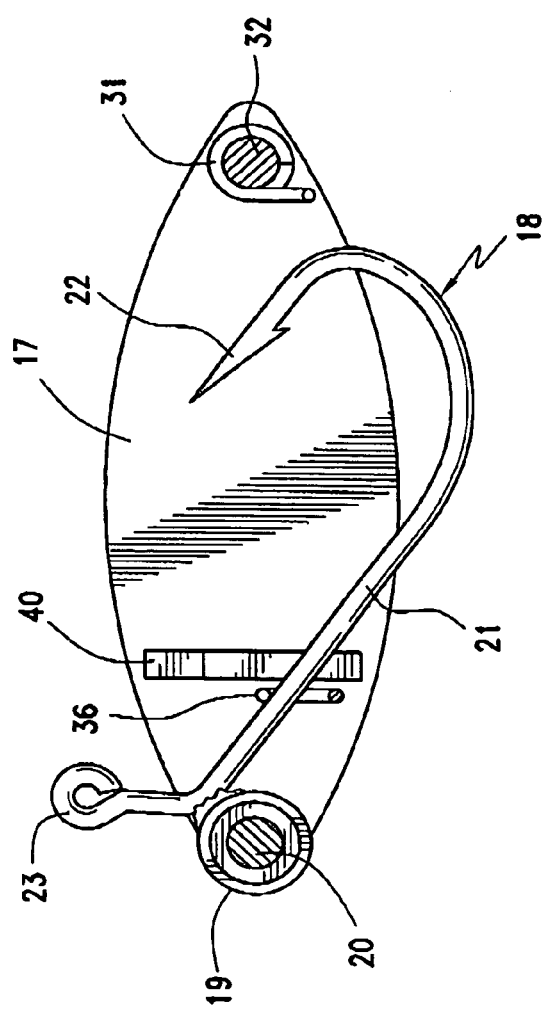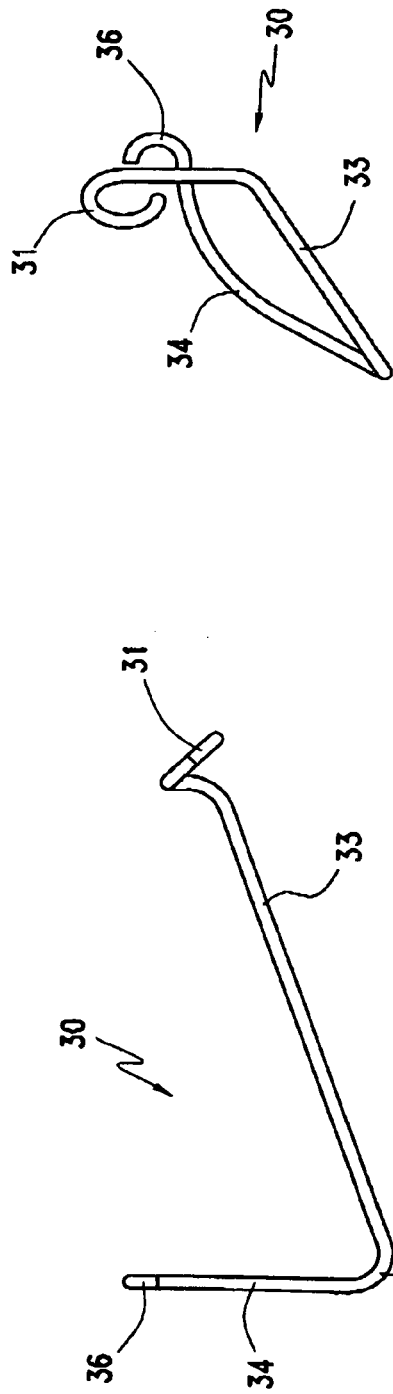

FISHING LURE WITH CONCEALED HOOK

CROSS REFERENCE TO RELATED APPLICATIONS

This application is a Continuation-in-part of application Ser. No. 10/310,788, filed Dec. 6, 2002 now abnd. in the name of the same inventor.

BACKGROUND OF THE INVENTION

1. Field of the Invention

This invention is generally directed to fishing lures and, more particularly, to a fishing lure having at least one deployable hook which is normally concealed and which is retained adjacent to or within a body of the lure by a retaining clip which is released upon the application of pressure to a portion of the clip extending outwardly of the lure body upon the strike of a fish. The retaining clip is specifically configured to permit release of the at least one hook regardless of the direction of fish strike on the lure.

2. History of the Related Art

One of the major problems routinely encountered by fishermen when fishing in rivers, lakes, ponds and other shallow areas is that hooks are easily snagged when engaged with underwater debris, grass or other vegetation, rocks, roots and the like. Once a lure becomes snagged, it is practically impossible to free the hook and, therefore, it is often necessary that the fishing line be cut and a new lure attached. This procedure is not only time-consuming, but is also expensive for fishermen. In addition, the hooks remain in underwater areas which can also present a safety hazard, especially if the area being fished is one used for recreational swimming and/or boating.

There have been numerous lures designed to conceal a hook prior to a fish strike so that the hook cannot accidentally become engaged or snagged as previously discussed. Unfortunately, many such lures have proven not to be sufficiently adequate to prevent premature activation of the hook prior to a fish strike or are only effective if a fish strikes in a particular direction. In U.S. Pat. No. 2,205,773 to Fox, a fishing lure is disclosed having a body portion in which a hook is normally concealed. The base of the hook is designed to be formed or attached with a bifurcated fishing or lead line with the other portion of the fishing line being engaged to a wire which passes through a retaining member having a narrow slot formed between a pair of openings. The wire is normally secured within a smaller opening thereby preventing movement of the fishing line relative to the lure body. A release mechanism is mounted exteriorly of the lure and is connected to the fishing line so as to push the fishing line inwardly relative to the lure body to thereby shift the line or wire from the smaller opening through the narrow slot to a larger opening wherein the fishing line is allowed to play out relative to the lure body. This action simultaneously pivots the hook to an extended position. Unfortunately, with this type of structure, not only is it necessary to provide a special lead for securing the lure by bifurcating the fishing line to connect both to a trigger mechanism and the hook, but it is also possible to prematurely release the hook by accidental bumping of the release mechanism, thereby shifting the line from a retained to a release position. Such accidental releasing of the hook may easily occur as the lure is pulled through grassy areas or engages objects or debris beneath the water surface. Further, should the lure engage the body of a fish even though no striking action has taken place, the releasing mechanism can be activated to release the hook.

A variation of non-snag or weedless fishing lure is disclosed in U.S. Pat. No. 3,665,634 to Baud. In Baud, the fish hook is normally concealed within the body of the lure and is pivotally connected to a lead line which extends outwardly from the body. A release trigger is also pivotally mounted within the body and normally engages the hook to prevent pivoting movement or release of the hook and extends outwardly of the body where it may be engaged upon the strike of a fish in a particular direction. Unfortunately, the release trigger may also be easily released by accidentally contacting grasses, debris and any other objects under the water surface, thereby prematurely activating the hook. A similar mechanism incorporating a spring assist to further deploy the hook from the body of the lure is disclosed in U.S. Pat. No. 4,562,661 to Messinger et al.

As opposed to trigger release type lures, other weedless fishing lures have been designed to incorporate cam and spring mechanisms which normally retain a hook within the body of a lure. Examples of such lures are disclosed in U.S. Pat. No. 1,890,266 to Schadell et al., U.S. Pat. No. 4,176,489 to Levstak and U.S. Pat. No. 4,782,618 to Rainey. Unfortunately, fishing lures incorporating spring-operated hook mechanisms frequently fail as the spring mechanisms become worn, broken or fouled by normal debris encountered when fishing. In addition, spring-loaded release mechanisms for hooks can be very hazardous as the hooks can be accidentally released while in the hand of a fisherman creating puncture wounds. Further, mechanisms which require mechanical cam and spring devices are normally more complicated and expensive to manufacture.

Additional examples of snag-proof or weedless fishing lures are disclosed in U.S. Pat. No. 4,020,583 to Gailyn and U.S. Pat. No. 5,097,619 to Bologna.

SUMMARY OF THE INVENTION

The present invention is directed to a non-snag, weedless type fishing lure including a body, which may be simulative of a minnow or other aquatic animal or an inanimate object. In one embodiment, the body has a slotted opening therein in which a hook is normally concealed in a non-deployed position. In another embodiments, one or more hooks may be concealed on one or both sides of the body such that the tips of the hooks do not extend outwardly of an outline of the body in a non-deployed position. Each hook includes a base which is pivotable about a pin extending through the body and has an eye integrally formed with a shank portion thereof to which a fishing or lead line may be selectively secured. When hooks are mounted to a common pivot pin, only one of the hooks must include an eye for attachment of the fishing or lead line.

A retaining clip is mounted at one end to the body and has a first portion which extends outwardly and downwardly of the body and a second portion which extends therefrom inwardly in an arc and then generally transversely with respect to the shank of the hook. The outer end of the second portion of the retaining clip includes a hook-like catch for normally engaging the shank of the fish hook to thereby retain the fish hook adjacent to or within the body of the lure in the non-deployed position. When a fish strikes the lure by taking the lure in its mouth, regardless of the direction of strike, the retaining clip is squeezed inwardly relative to the body, thereby shifting the catch end portion thereof from the shank of the hook. Simultaneously, a force applied along the line causes the hook to pivot about the pivot pin, thereby extending the fishing hook outwardly relative to the body of the lure and hooking the fish.

As a further feature, a friction or force applying member may be mounted to or within the body of the lure so as to frictionally engage against the retaining clip to thereby prevent accidental shifting of the clip toward the body to thereby prevent release of the fishing hook until a force sufficient to overcome a predetermined frictional force is applied, such as by a fish strike.

It is a primary object of the present invention to provide a non-snag weedless type fishing lure of a type wherein at least one hook is normally retained within the body of the lure or is concealed adjacent to the lure in a non-deployed position and is prevented from accidental release until such time as the lure is subjected to the strike of a fish.

It is also an object of the present invention to provide a weedless type fishing lure which can be manufactured inexpensively and which can be designed to prevent premature release of at least one the hook from or relative to the body of the lure until a predetermined pressure is applied to a release mechanism, thereby preventing accidental release of the hook during handling, casting and trolling of the lure through the water, thereby both preventing accidental injury to an individual handling the lure and also preventing accidental deployment of the fishing hook by engagement of the lure with underwater objects.

It is a further object of the present invention to provide a weedless fishing lure having at least one concealed fishing hook which may be very easily reset or re-concealed after deployment and which will not fail after repeated usage.

It is yet another object of the invention to provide a weedless fishing lure which has a specially configured retaining clip which is designed to release the fish hook upon the strike of a fish on the lure regardless of the direction of the strike relative to the lure.

BRIEF DESCRIPTION OF THE DRAWINGS

A better understanding of the invention will be had with reference to the accompanying drawings, wherein:

FIG. 1 is a side view of a non-fouling fishing lure incorporating the improvements of the invention showing the hook of the lure in a concealed position within the lure body to prevent fouling of the lure;

FIG. 2 is a top plan view of the fishing lure of FIG. 1 showing an attached snap swivel;

FIG. 3 is a rear elevational view of the fishing lure of FIG. 1;

FIG. 4 is a cross sectional view taken along line 4—4 of FIG. 2;

FIG. 5 is a rear elevational view of the hook retaining clip of the invention;

FIG. 6 is a side view of the hook retaining clip of FIG. 5; and

DESCRIPTION OF THE PREFERRED EMBODIMENT

Figure 7:
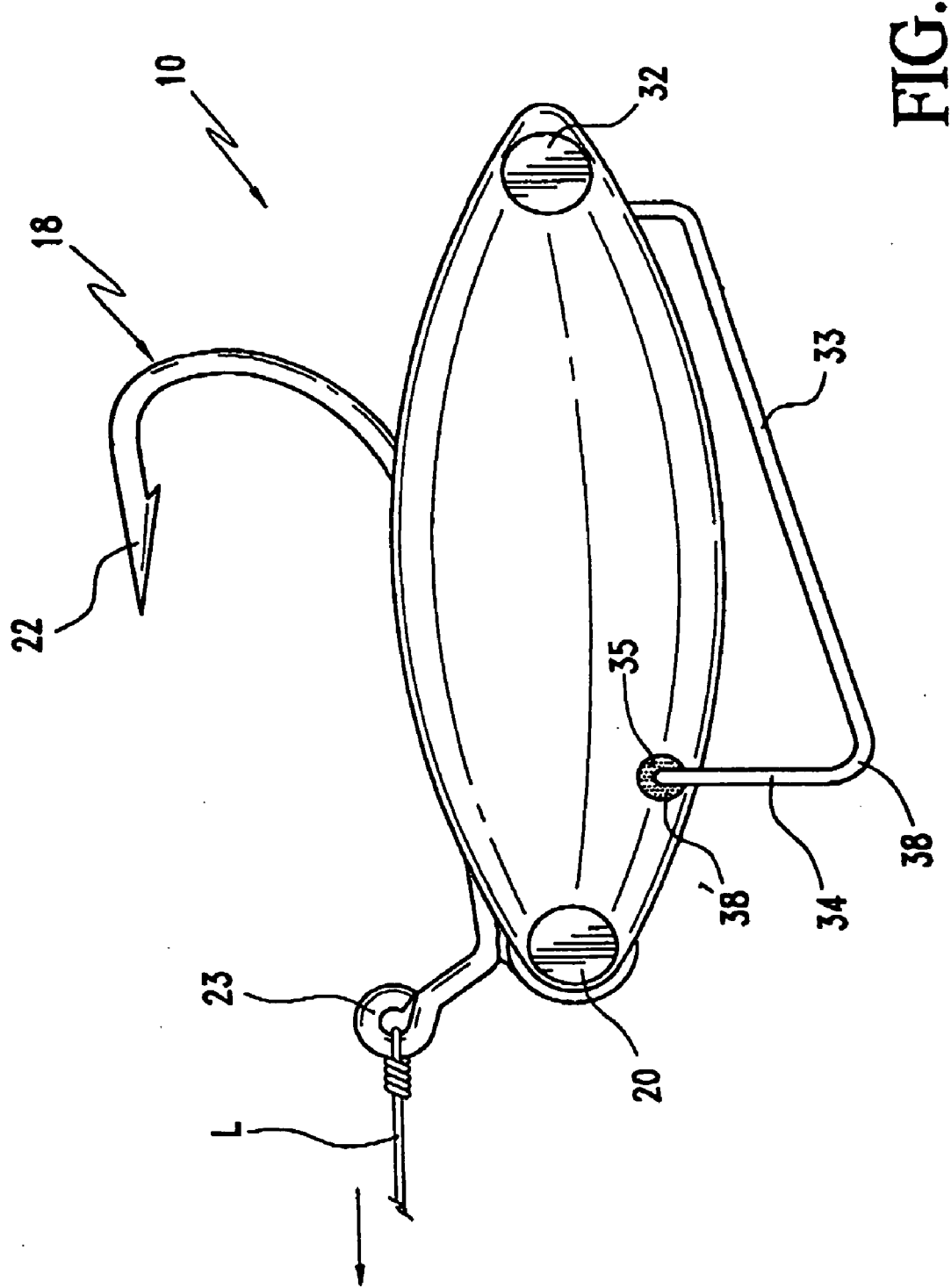
FIG. 7 is a side view similar to FIG. 1 but showing the hook deployed after a fish bites the lure.

With continued reference to the drawings, the present invention is shown in FIGS. 1–7 as directed to a fishing lure 10 having a body 11 having a forward portion 12 and a rear portion 13. A slotted opening or space 15 is provided in the body between side portions 16 and 17. The slotted opening defines an interior chamber in which a hook 18 is normally concealed in a non-deployed position. The hook includes a base or pivot portion 19 which is pivotally mounted about a pin 20 extending through the front of the lure which serves to anchor the hook relative to the body. The hook further includes a shank 21 and an outer barbed hooked end 22. Extending outwardly from the shank is an eyelet 23 to which a fishing or lead line "L" may be secured. As shown by the arrows in the drawing figures, when a pull is applied along the fishing line "L", a force is created tending to pivot the fishing hook outwardly of the chamber into a fully deployed or extended position.

To retain the hook within the body, a retaining clip 30 has a first end 31 secured about a pin 32 extending between the side portions 16 and 17 of the body and adjacent the rear portion 13 thereof. A first portion 33 of the retaining clip extends downwardly and outwardly from the body and then forwardly and downwardly relative to the body at an angle of approximately 45° relative to a plane extending centrally and vertically through the body. Thereafter, the clip has a second portion 34 which extends upwardly in an arc of a circle to adjacent a side of the body and then extends inwardly of the body through a small opening 35 and generally transversely with respect to the shank of the hook and upwardly at an angle of approximately 10° relative to a plane extending normal to a vertical axis of the body. The retaining clip includes a second end in a form of an inner catch or hooked portion 36 which normally engages the shank 21 of the fish hook to thereby retain the fish hook within the body of the lure.

The retaining clip is preferably formed of a metallic wire and, due to its configuration and manner of mounting, the clip is normally resiliently urged to the hook latching position of FIGS. 1–3. It should be noted that the area of the retaining clip at the junction 38 of the first and second portions thereof protrudes approximately equally outwardly of the side 16 of the lure and below a central axis "A—A" of the body of the lure.

The function of the curved and angled portions of the retaining clip is to allow release of the hook 18 regardless of a direction a fish may approach and bite or strike the lure. The curved portion of the retaining clip, ending in the point or junction 38, is disposed to the side of and opposite the upper part of the lure from which the hook 18 extends. This allows pressure from either a direction normal to the plane of the lure body or parallel to it, or along any direction therebetween to move the clip 30 transversely into the lure body, releasing the catch 36. This is because the angle and curve of the retaining clip 30 form a component of force in a tangential direction reacting against the edge of the opening 35 in the body of the lure through which it passes when a force is applied in the plane of the lure.

It is possible to line the opening 35 with a grommet 38' or other friction-producing member, see FIG. 7, which may be provided so as to apply a selective frictional force against the retaining clip to thereby prevent accidental shifting of the retaining clip from the fish hook engaging position shown in FIG. 4 to a release position as shown in FIG. 5. By regulating the frictional engagement, the amount of pressure which must be applied to shift the retaining clip may be selectively regulated.

During the use of the lure, the fishing hook 18 is secured to the fishing or lead line "L". Thereafter, the hook is easily urged inwardly of the body thus forcing the retaining clip to move inwardly of the lure body until the retaining clip snaps back into engagement with the shank of the hook as shown in FIG. 2, thereby securing the hook within the lure. The hook is positive guided within the body by a guide flange 40 which is mounted to an inner surface of side portion 17 of the body of the lure. After the lure is cast, should the lure be subject to the strike of a fish, as the fish's mouth closes around the lure, the retaining clip will be shifted transversely with respect to the shank 21 of the fish hook, thereby releasing the fish hook and allowing the hook to pivot to the deployed position, as shown in FIG. 7.

Although not shown in the drawings, in addition to or in lieu of the friction-engaging member previously discussed, a leaf-type spring may be provided within the body of the lure. The leaf spring would normally engages a length of the second portion 34 of the retaining clip and thereby prevent accidental shifting of the clip until a predetermined force is applied thereto. As with the previous embodiment, the amount of force may be selectively varied so as to prevent accidental deployment of the fish hook until a predetermined force is applied to the retaining clip.

In the embodiment shown, the retaining clip is mounted such that it is attached to the rear end portion of the lure. Therefore, the retaining clip extends outwardly relative to the forward portion of the lure and then inwardly of the body of the lure. In this manner, as the lure is being pulled through the water, if the lure encounters any object, the force applied on the clip will tend to bind the clip relative to the opening 35 in the body of the lure or pull the clip from the lure, as opposed to pushing the clip inwardly of the lure. Therefore, the retaining clip is secured in such a manner as to further facilitate the non-fouling or snagging features of the lure when in use and prevent premature deployment of the fish hook 18.

It should also be noted that the slotted opening 15 may extend only partially into a solid body 11 not having separate sides or half sections.

As previously described, in some embodiments one or more hooks may be positioned outside of the body of the lure and be retained in a non-deployed position by the retaining clip 30. Such an extension mounting of the hook, or hooks, is not preferred because the hooks could be accidentally contacted when not deployed.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

What is claimed is:

1. A non-fouling fishing lure comprising,
   a body having front and rear portions,
   at least one fish hook pivotally mounted to said body and including a shank portion extending from a pivot means to a barbed end portion, said at least one fish hook further including a portion extending from said shank portion for engagement to a fishing line, said at least one fish hook being pivotable from a first non-deployed position wherein at least said barbed end portion thereof is concealed by said body to a second deployed position wherein said barbed end portion extends outwardly with respect to said body, and
   a retaining clip having a first end mounted to said rear portion of said body and having a first intermediate portion extending downwardly and outwardly from said first end in a direction opposite the second deployed position of said at least one fish hook and toward said front portion of said body and a second intermediate portion curving upwardly in an arc from said first intermediate portion toward a side portion of said body and extending through an opening in said side portion of said body and generally transversely with respect to said shank portion of said at least one fish hook to a second end which forms a catch for selectively engaging said shank portion of said at least one fish hook when in a first position, said retaining clip being moveable inwardly relative to said body to a second position wherein said catch is released from said shank portion of said at least one fish hook thereby allowing said at least one fish hook to be pivoted from said first concealed position to said second deployed position.

2. The fishing lure of claim 1 wherein said retaining clip is normally biased to said first position.

3. The fishing lure of claim 1 wherein said engaging means includes a spring element.

4. The fishing lure of claim 2 wherein said catch is in a form of a small hook engageable with said shank portion of said at least one fish hook.

5. The fishing lure of claim 1 wherein said catch is in a form of a small hook engageable with said shank portion of said at least one fish hook.

6. The fishing lure of claim 5 in which said intermediate portion of said retaining clip flares outwardly away from said body to said extension portion.

7. The fishing lure of claim 1 wherein said retaining clip is mounted adjacent said rear portion of said body and said pivot means is positioned adjacent said front portion of said body.

8. The fishing lure of claim 1 including first and second hooks mounted to said pivot means on opposite sides of said body.

9. The fishing lure of claim 1 including friction means provided within said opening in said body for resisting movement of said retaining clip toward said second position.

10. The fishing lure of claim 1 wherein said body includes an inner chamber in which said at least one hook is positioned when in said non-deployed position.

11. The fishing lure of claim 10 including engaging means engageable with said retaining clip for normally retaining said retaining clip in said first position.

12. The fishing lure of claim 11 wherein said engaging means includes a spring element.

13. The fishing lure of claim 11 in which said engaging means includes a grommet mounted within an opening in said body of the lure through which said intermediate portion of said retaining clip passes.

14. The fishing lure of claim 11 in which said engaging means includes a leaf spring mounted within said body of the lure, said leaf spring being engageable with said intermediate portion of said retaining clip to thereby apply a force normally holding said retaining clip in said first position.

15. A non-fouling fish lure comprising,
   a body having front and rear portions and an opening therein communication with a chamber,
   a pivot pin means mounted to said body in an open communication with said chamber,
   a fish hook pivotally mounted about said pivot pin means and including a shank portion extending from said pivot pin means to a hooked barbed end portion, said fish hook further including an eyelet extending from said shank portion for engagement with a fishing line, said fish hook being pivotable from a first concealed position wherein at least said barbed end portion thereof is concealed within said chamber of said body of the lure to a second deployed position wherein said hooked barbed end portion extends outwardly with respect to said body of the lure, a retaining clip having a first end mounted to said body of the lure and having an intermediate portion extending outwardly from said body and an extension portion extending inwardly into said chamber within said body and generally transversely with respect to said shank portion of said fish hook and which includes a catch for selectively engaging said shank portion of said fish hook when in a first position, said retaining clip being moveable inwardly relative to said body to a second position wherein said catch is released from said shank portion of said fish hook, thereby allowing said fish hook to be pivoted from said first concealed position to said second deployed position.

16. The fishing lure of claim 15 including engaging means engageable with said retaining clip for normally retaining said retaining clip in said first concealed position.

17. The fishing lure of claim 16 in which said engaging means includes a grommet mounted within an opening in said body of the lure through which said retaining clip passes.

18. The fishing lure of claim 16 in which said engaging means includes a leaf spring mounted within said body of the lure, said leaf spring being engageable with said intermediate portion of said retaining clip to thereby apply a force normally holding said retaining clip in said first position.

19. The fishing lure of claim 16 wherein said catch is in a form of a small hook engageable with said shank portion of said fish hook.

20. The fishing lure of claim 15 wherein said catch is in a form of a small hook engageable with said shank portion of said fish hook.

* * * * *